United States Patent Office 3,316,291
Patented Apr. 25, 1967

3,316,291
UNSATURATED ESTERS OF HALOHYDRINS
Rostyslaw Dowbenko, Gibsonia, Pa., assignor to Pittsburgh Plate Glass Company, Pittsburgh, Pa., a corporation of Pennsylvania
No Drawing. Filed Aug. 11, 1965, Ser. No. 478,978
8 Claims. (Cl. 260—485)

This application is a continuation-in-part of copending application Ser. No. 228,239, filed Oct. 4, 1962.

This invention relates to a method for producing halohydrins in which three halogen atoms are attached to a single carbon atom and to epoxides and esters made therefrom.

Halohydrins having several halogen atoms are valuable because they can be used to produce epoxides, esters and similar derivatives containing correspondingly high halogen content. For example, epoxides having additional halogen atoms are especially desirable because the resins produced therefrom have properties, such as high flammability limits, which make them uniquely valuable for certain applications. Similarly, there are few halogenated polyesters known; consequently, ester monomers rich in halogen are also particularly valuable.

Trichloromethyl halohydrins have been produced heretofore by the reaction of trichloromethane sulfonyl chloride with an olefinic compound, as disclosed in U.S. Patent No. 2,568,859. This method is not commercially feasible because the reactants are expensive and difficult to obtain.

This invention provides a new and improved method for producing halohydrins having up to 3 halogen atoms substituted on a single carbon atom of the epoxy-containing molecule, and which have unusually high over-all halogen content.

The basis for the present invention is the discovery that a halide such as a carbon tetrahalide or an alkyl substituted haloform reacts with an ethylenically unsaturated alcohol in the presence of certain catalysts by adding across the double bond while the hydroxyl group of the alcohol is essentially unaffected. The resulting halohydrin contains 3 or 4 halogen atoms and a hydroxyl group.

The halides used correspond to the formula:

$$R_1CX_3$$

where $R_1$ is a halogen or an alkyl group and X is halogen. Thus, when $R_1$ is a halogen, the halide is a carbon tetrahalide and when $R_1$ is alkyl, the halide is an alkyl haloform such as methyl haloform or ethyl haloform.

The unsaturated alcohols to which this invention relates and which react in the aforesaid manner are defined by the following formula:

where $R_2$, $R_3$, $R_4$, $F_5$ and $R_6$ are each hydrogen or alkyl radicals having from 1 to 20 carbon atoms. Included among these unsaturated alcohols are allyl alcohol, methallyl alcohol and crotyl alcohol, which are those alcohols which are presently preferred for use in the invention, as well as such alcohols as 2-methyl-3-buten-2-ol, 3-penten-2-ol, 3-methyl-3-buten-2-ol, 2,3-dimethyl-3-buten-2-ol, 4-methyl-3-penten-2-ol, 3,4-dimethyl-3-penten-2-ol, 2,3,4-trimethyl-3-penten-2-ol, 3-methyl-2-penten-3-ol, 3-isopropyl-3-buten-2-ol, 2-butyl-3-methyl-1-hepten-3-ol, 4-octadecyl-3-penten-2-ol, 3-hexyl-3-buten-2-ol, and similar alcohols of the class defined above.

Carbon tetrachloride is preferably used as the carbon tetrahalide and thus the halohydrins produced are chlorohydrins. However, other carbon tetrahalides can be used if desired, such as, for example, carbon tetrabromide, in which case the halohydrins are bromohydrins. Similarly, the preferred substituted haloforms are the alkyl chloroforms, and particularly the lower alkyl substituted chloroforms.

The reaction by which the halohydrins are produced can be represented by the following:

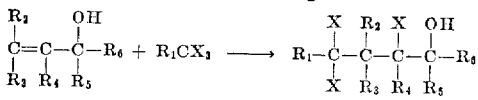

where X is halogen and $R_2$, $R_3$, $R_4$, $R_5$ and $R_6$ are as defined above. Illustrating the reaction in specific embodiments are the following, in which the reactions of allyl alcohol and methallyl alcohol with carbon tetrachloride and methyl chloroform are shown:

(1)
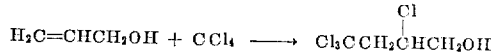

(2)
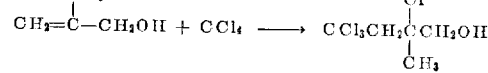

(3)
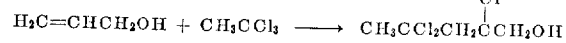

(4)
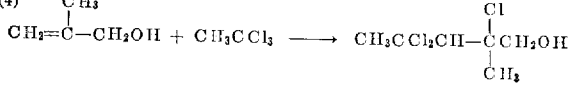

In order to achieve the desired product in satisfactory yields, it is necessary to carry out the reaction in the presence of a catalyst comprising a halide of a metal having two oxidation states which differ by one electron. Thus, for example, the catalyst should be a halide, preferably a chloride or bromide, of iron, copper, cobalt, chromium, nickel, mercury, and similar metals which correspond to the above degnition. Ordinary catalytic quantities of the above materials are employed, usually about one gram or more of catalyst per mole of alcohol.

The nature of the catalyst is quite critical inasmuch as it has been found that the process is unsatisfactory using other types of catalytic materials. For example, free radical type catalysts such as benzoyl peroxide do not effectively catalyze the reaction to produce the desired product. Instead, they result in very low yields and chiefly impure, complex products which in many instances cannot be isolated or identified.

Other reaction conditions are not critical. It is preferable to heat the reaction mixture moderately, for instance, at 30° C. to 150° C. It is convenient to reflux the mixture if the components boil at such temperatures. The reaction can be carried out in a solvent, if desired, and it is often desirable to do so, especially when one or both of the reactants are solids at ordinary temperatures. Any inert solvent for the reactants or products can be used, including saturated alcohols or saturated hydrocarbons.

The halohydrins produced in the above manner can be used as such, for example, in organic synthesis, or they can be converted to epoxides in accordance with the following equation:

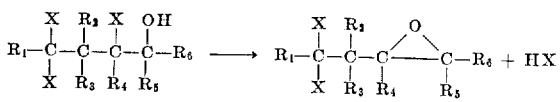

where X, $R_1$, $R_2$, $R_3$, $R_4$, $R_5$ and $R_6$ are as defined above. The reaction to produce the epoxide from the halohydrin can be carried out by any conventional method used to produce epoxides from known halohydrins, since it has been found that the presence of the trihalogcarbon group or the alkyldi-halo-substituted group on the molecule does not interfere with the desired conversion. The usual method of producing the epoxide is to heat the halohydrin in the presence of a base. Any one of the bases ordinarily used for this purpose can be used herein, but it is generally preferred to use a hydroxide of an alkali metal or an alkaline earth metal, or similar metal hydroxides. Depending upon the reaction system, other basic compounds, such as the carbonates of the above metals, can also be used if desired. Organic bases, such as pyridine, while used in some cases, are ordinarily not desirable unless particularized conditions are employed, because they often tend to open the epoxide ring and thus reduce the yield of the desired epoxide.

The halohydrins of this invention are also advantageously utilized to produce the corresponding esters by reaction with an unsaturated carboxylic acid. Any unsaturated carboxylic acid can be used with these halohydrins to produce esters, including, for example, unsaturated monocarboxylic acids such as acrylic acid, methacrylic acid and crotonic acid, as well as unsaturated dicarboxylic acids, for instance, maleic acid and fumaric acid. Thus, there can be employed lower alkenoic acids and lower alkendioic acids. There may also be employed mixtures of unsaturated carboxylic acids, such as the fatty acids obtained from naturally occurring vegetable and marine drying and semi-drying oils. The anhydrides of the above acids can be substituted for the acids if so desired.

The esters produced from the halohydrins of this invention are particularly desirable in producing polyesters and other polymers, and their high halogen content provides unusual properties in such products. Homopolymers of these esters as well as their copolymers with other polymerizable monomers, such as methyl methacrylate, styrene and the like, are produced by free-radical initiated reactions using benzoyl peroxide and other such catalysts. The polymers obtained are useful as protective and decorative coatings on steel or other substrates, as well as in films and similar conventional applications for polymers of this general type. In many cases, the polymers obtained are self-extinguishing i.e., do not support a flame, this highly advantageous property being generally obtained in polymers containing about 50 mole percent or more of the esters of the invention.

In addition to providing polymeric compositions for coatings and other uses, the esters herein are also useful as plasticizers, for instance, they effectively plasticize poly(vinyl chloride) and similar materials being used for this purpose, in the same manner as known plasticizers for such materials.

The following examples illustrate the method and practice of producing the halohydrins by the method of the invention, but the invention should not be construed as being limited to their details. All parts and percentages throughout this specification are by weight unless otherwise specified.

EXAMPLE A

A three-liter, four-necked flask with a condenser, stirrer and thermometer was charged with 174 parts of allyl alcohol, 1600 parts of carbon tetrachloride, 235 parts of isopropyl alcohol, and 15 parts of ferric chloride hexahydrate. The mixture was heated to 69° C. and refluxed at that temperature for 21 hours. The solvent and unreacted allyl alcohol were distilled off and the product mixture was washed with water and distilled. Three hundred and eight (308) parts of 2,4,4,4-tetrachlorobutanol were recovered at 68° C.–74° C. at 0.55 to 0.65 mm. pressure. The product was identified by infrared and gas chromatographic analysis, as well as by preparation of derivatives such as the benzoate. The identification was confirmed by chemical analysis as follows:

*Analysis* (calculated for $C_4H_6Cl_4O$): Calculated, percent: C, 22.69; H, 2.85; Cl, 66.93. Found: C, 23.49; H, 3.06; Cl, 69.79.

EXAMPLE B

A two-liter, four-necked flask with condenser, stirrer and thermometer was charged with 144 parts of methallyl alcohol, 800 parts of carbon tetrachloride, 10 parts of ferric chloride hexahydrate, and 156 parts of isopropyl alcohol. The reaction mixture was heated to reflux at 71° C. and maintained at that temperature for 48 hours. The reaction mixture was then cooled, washed with water and dried. It was then distilled and after removal of the solvent and unreacted methallyl alcohol, 94 parts of product, 2-methyl-2,4,4-trichlorobutanol, were recovered at 73° C.–83° C. at 0.3 to 0.4 mm. of mercury pressure. The product was identified by infrared and gas chromatographic analysis.

EXAMPLE C

A flask was charged with 58 parts of allyl alcohol, 165 parts of carbon tetrabromide, 2.5 parts of ferric chloride hexahydrate and 78 parts of isopropyl alcohol. The mixture was heated to 90° C. and refluxed for 37 hours. After filtering, the reaction mixture was distilled and 2,4,4,4-tetrabromobutanol was recovered as the fraction boiling at 100° C.–125° C. at 0.15 to 0.2 mm. of mercury. Identification of the product was by infrared and gas chromatographic analysis, and was confirmed by chemical analysis.

EXAMPLE D

A flask was charged with 174 parts of allyl alcohol, 596 parts of 1,1,1-trichloroethane (methyl chloroform), 121 parts of butanol, and 15 parts of ferric chloride. The mixture was refluxed for 22 hours at 72° C.–73° C. Most of the solvent was then stripped off and the residue washed with water and extracted with diethyl ether. The ether layer was then dried over sodium sulfate, the ether evaporated and the crude product distilled. The desired product, 2,4,4-trichloropentanol, was obtained as the fraction boiling at 115° C.–118° C. at 10 mm. pressure. It was identified by infrared, gas chromatographic and chemical analysis.

The foregoing examples and other similar tests have demonstrated that the reaction of a carbon tetrahalide or an alkyl haloform as described herein takes place with unsaturated alcohols of the class described hereinabove and that the reaction can be carried out in the presence of any catalyst comprising the halide of any metal having two oxidation states which differ by one electron. While, as in the examples above, ferric chloride is usually used because it is readily available and easily handled, other catalysts of the class described, such as ferrous chloride, cupric chloride, cuprous chloride, and the like, are used in the same manner.

As discussed above, the halohydrins produced from the reactions as illustrated can be very advantageously utilized in producing esters by reaction with an unsaturated carboxylic acid or in producing epoxides by heating the halohydrin in the presence of a base. Because the halogens contained in the halohydrin are not affected and provide properties which are especially desirable, the epoxides produced can be used to make epoxy resins of particular value. The following example illustrates the manner in which epoxides are formed from the halohydrins. In the example set forth, the halohydrin used is that produced in Example A above.

EXAMPLE E

A solution of 4 parts of sodium hydroxide and 100 parts of water was added to 20 parts of 2,4,4,4-tetrachlorobutanol and heated to 60° C. for 37 hours, at which time the pH of the solution was about 8.5. The reaction mixture was extracted with diethyl ether and the ether evaporated from the organic layer, leaving 16 parts of 85 percent pure 4,4,4-trichloro-1,2-epoxybutane, as identified by gas chromatographic analysis. Redistillation of the product produced a fraction boiling at 108° C.–113° C. (93–94 mm. mercury) which was identified as 99 percent pure 4,4,4-trichloro-1,2-epoxybutane.

The following examples demonstrate the manner in which esters are produced by reacting an unsaturated carboxylic acid with a halohydrin of the class described above. In those embodiments illustrated in these examples, there are produced particularly desirable esters, which can be used to make polyesters and other resinous materials of extremely high halogen content.

*Example 1*

A glass reaction flask equipped with a stirrer, condenser, thermometer, fractionating column, water trap and gas inlet tube was swept with an inert gas and charged with 20.2 parts of 2,4,4,4-tetrachlorobutanol, 10 parts of benzene, 0.025 part phenothiazine, 0.11 part concentrated sulfuric acid, and 15 parts of acrylic acid. The mixture was heated slowly to reflux and maintained at this temperature for 3½ hours while slowing removing water azeotropically. About 20 parts of diethyl ether were then added and the reaction mixture was washed first with sodium bicarbonate solution and then with water. After drying the washed solution over sodium sulfate, 0.2 part hydroquinone was added, the solvent was stripped off, and the residue distilled under reduced pressure. There were obtained 17.7 parts of 2,4,4,4-tetrachlorobutyl acrylate, boiling point 71° C.–72° C. at 0.20 mm. pressure. The product was identified by infrared and gas chromatographic analysis and its identity was confirmed by chemical analysis as follows:

Analysis (calculated for $C_7H_8Cl_4O$): Calculated, percent: C, 31.61; H, 3.03; Cl, 53.33. Found: C, 31.60; H, 3.32; Cl, 53.39.

*Example 2*

A flask was charged with 20.2 parts of 2,4,4,4-tetrachlorobutanol, 10 parts of benzene, 0.025 part phenothiazine, 0.11 part concentrated sulfuric acid, and 8.70 parts of methacrylic acid. The mixture was refluxed for about 4 hours with the water formed being removed azeotropically. About 20 parts of diethyl ether were then added and the mixture was washed with sodium bicarbonate solution and water, dried and distilled. Twenty (20) parts of 2,4,4,4-tetrachlorobutyl methacrylate were obtained with a boiling point of 70° C.–72° C. at 0.25 mm. pressure. The product was identified by infrared and gas chromatographic analysis.

In a similar manner are produced esters of other unsaturated carboxylic acids. For instance, bis(2,4,4,4-tetrabromobutyl) maleate is produced from maleic acid.

According to the provisions of the patent statutes, there are described above the invention and what are now considered to be its best embodiments. However, within the scope of the appended claims, it is to be understood that the invention can be practiced otherwise than has been specifically described.

I claim:

1. An ester of lower alkenoic acid or lower alkendioic acid and a haloyhdrin of the formula:

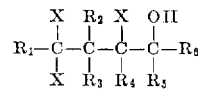

where X is halogen, $R_1$ is selected from the class consisting of halogen and lower alkyl radicals, and $R_2$, $R_3$, $R_4$, $R_5$ and $R_6$ are each selected from the class consisting of hydrogen and alkyl radicals of from 1 to 20 carbon atoms.

2. An ester as in claim 1 in which the acid is an unsaturated monocarboxylic acid.

3. An ester as in claim 1 in which said acid is an acrylic acid.

4. An ester as in claim 1 in which the acid is an unsaturated dicarboxylic acid.

5. An ester as in claim 1 in which X is chlorine.

6. An ester as in claim 1 in which X is bromine.

7. 2,4,4,4-tetrachlorobutyl acrylate.

8. 2,4,4,4-tetrachlorobutyl methacrylate.

References Cited by the Examiner

UNITED STATES PATENTS

| | | | |
|---|---|---|---|
| 2,642,416 | 6/1958 | Ahlbrecht et al. | 260—486 |
| 3,177,185 | 4/1965 | Hollander et al. | 260—486 |

LORRAINE A. WEINBERGER, *Primary Examiner.*

A. P. HALLUIN, *Assistant Examiner.*